United States Patent [19]

Mackey

[11] 4,054,218
[45] Oct. 18, 1977

[54] TILTABLE TRAILER

[76] Inventor: James F. Mackey, Highway House, Rte. 1, Steamboat Springs, Colo. 80477

[21] Appl. No.: 729,667

[22] Filed: Oct. 5, 1976

[51] Int. Cl.² ............................................. B60P 3/00
[52] U.S. Cl. .................................. 214/506; 280/80 B
[58] Field of Search ..................... 214/505, 506, 501; 280/80 B

[56] References Cited

U.S. PATENT DOCUMENTS

| | | | |
|---|---|---|---|
| 2,806,710 | 9/1957 | Mascaro | 280/414.5 |
| 2,838,191 | 6/1958 | Schramm | 214/506 |
| 2,924,347 | 2/1960 | Scott, Sr. | 214/506 |
| 3,288,315 | 11/1966 | Bigden | 214/506 |

Primary Examiner—Albert J. Makay
Assistant Examiner—Lawrence E. Williams

Attorney, Agent, or Firm—Wm. Griffith Edwards

[57] ABSTRACT

A trailer for livestock and other loads comprising a frame resting on an axle member on which the vehicle wheels are mounted. The axle member is provided with two arms, one pivoted on each side of the trailer on supports extending above the frame. The wheels are swingable forwardly about the pivots to a position over center with respect to the pivots and by blocking the wheels and forcing the trailer rearwardly it is raised by the pivoting arms and tilts downwardly toward the rear until the arms strike stops limiting the swinging movement of the arms. A drawbar is pivoted to the frame on a horizontal axis parallel to that of the wheels and is positioned so that rearward force when the wheels are blocked tends to tilt the trailer. The trailer is arranged for easy handling by one man without the use of hydraulic jacks or the like.

7 Claims, 8 Drawing Figures

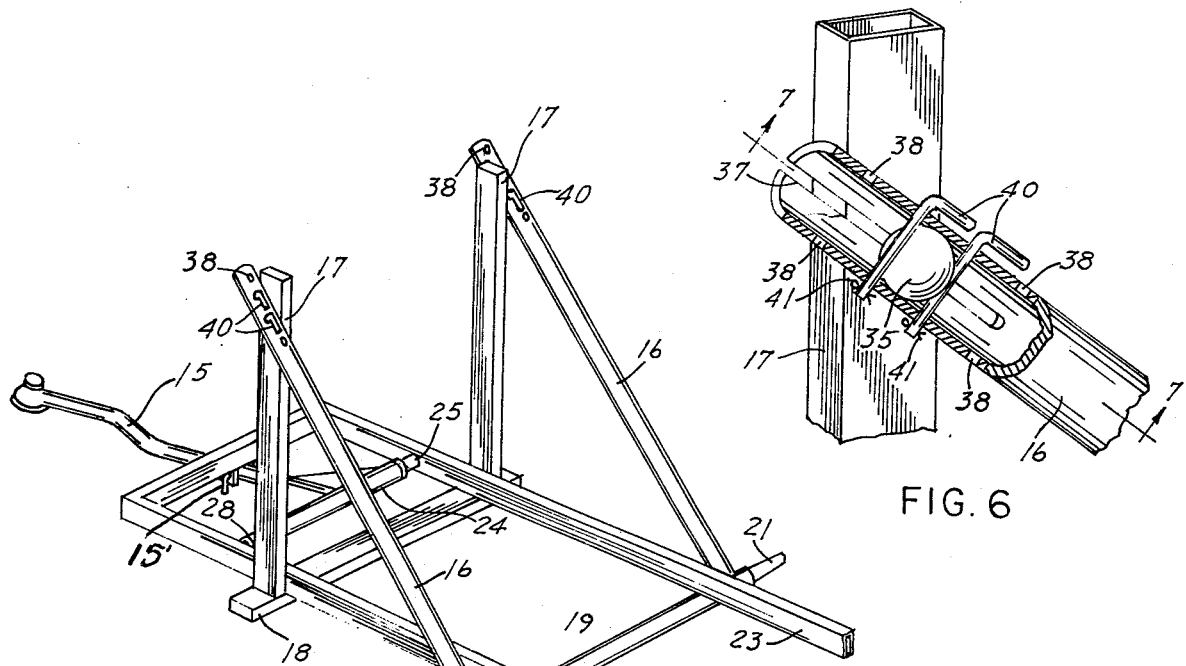
FIG. 6
FIG. 4
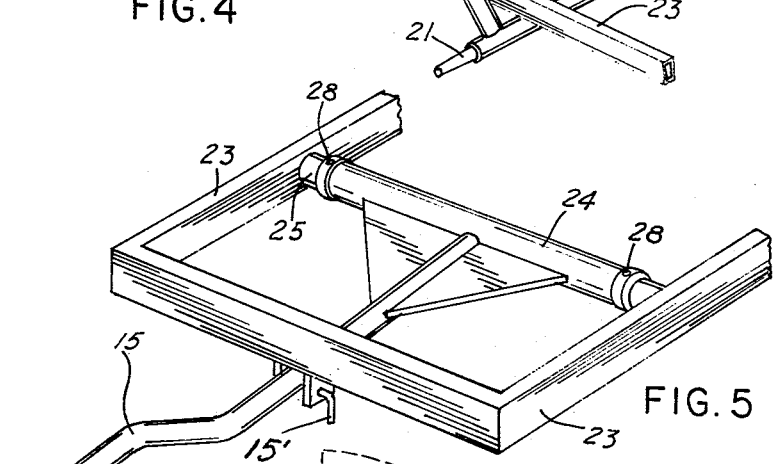
FIG. 5
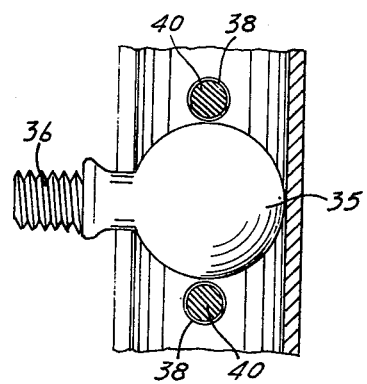
FIG. 7
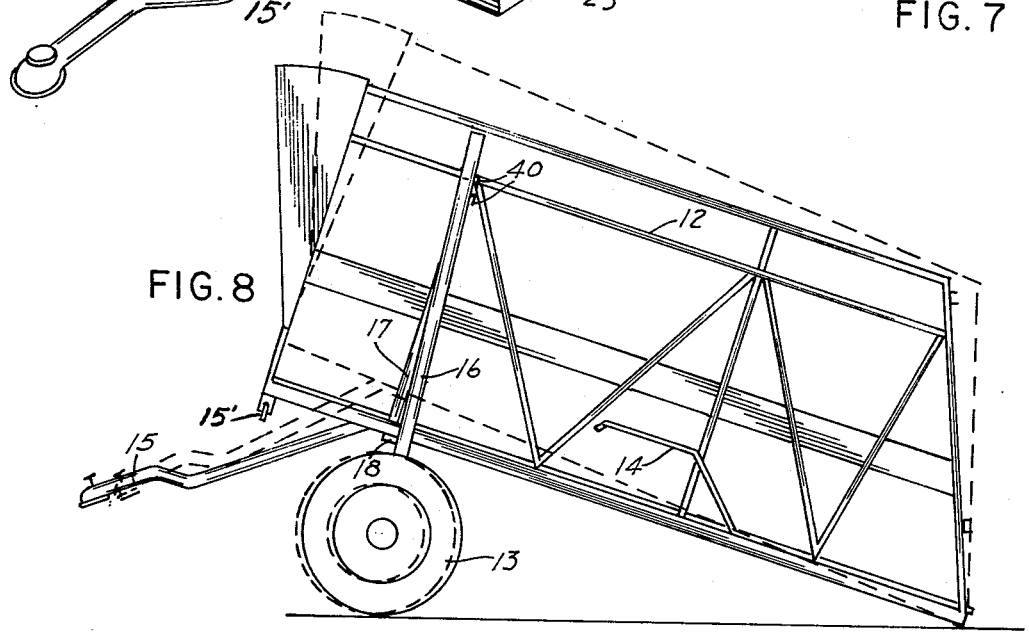
FIG. 8

TILTABLE TRAILER

This invention relates to motor vehicle trailers and particularly to an improved arrangement for facilitating the tilting of such trailers for loading and unloading purposes.

Motor vehicle trailers have come into very wide use for transporting livestock and other loads. It is desirable, particularly for use on small ranches and farms, that a single operator be able to maneuver the trailer for loading and unloading. The handling of the trailer is more complicated when the trailer is of the tilting type, and various actuating means and particularly hydraulic jacks have been employed for this purpose. It is desirable that the smaller trailers be easily manipulated by one person and accordingly it is an object of this invention to provide an automotive vehicle trailer having an improved and simple arrangement for tilting the trailer for loading and unloading.

It is another object of this invention to provide a motor vehicle trailer of the tiltable type including an improved arrangement for effecting the tilting without cranks or hydraulic jacks.

It is a further object of this invention to provide a motor vehicle trailer which may be tilted for loading and unloading by maneuvering the towing vehicle.

Briefly, in carrying out the objects of this invention in one embodiment thereof, a trailer is constructed with a rigid frame opposite upwardly extending side supports near the mid portion of the frame, and a pair of wheels mounted and an axle member on which the frame rests. The axle member has laterally extending arms adjacent the wheels which are pivotally connected to the side supports and are swingable about their pivot axis from a rearward position in which the frame rests on the member to a forward position which is overcenter with respect to the pivoted axis of the arms. A drawbar is mounted on the bottom side of the frame so that a towing vehicle when moved backwardly will cause the trailer to lift itself on the arms which swing about their pivots until the trailer has moved back and has tilted downwardly until its end rests on the ground; stops are provided for preventing swinging movement beyond a selected over center position of the arm pivots. The trailer is then positioned for loading or unloading in the manner of a ramp.

The features of novelty which characterize this invention are pointed out with particularity in the claims annexed to and forming a part of this specification. The invention itself, however, both as to its organization and its method of operation, together with further objects and advantages thereof, will best be understood upon reference to the following description taken in connection with the accompanying drawings in which:

FIG. 4 is a perspective view showing portions of the framework of the trailer;

FIG. 5 is an enlarged perspective view of the drawbar assembly of the trailer;

FIG. 6 is an enlarged perspective view, partly broken away, of a detail of the wheel arm pivot mounting;

FIG. 7 is a partial sectional view taken along the line 7—7 of FIG. 6; and

FIG. 8 is a side elevation of the trailer showing alternative positions of tilt.

Figure 1:
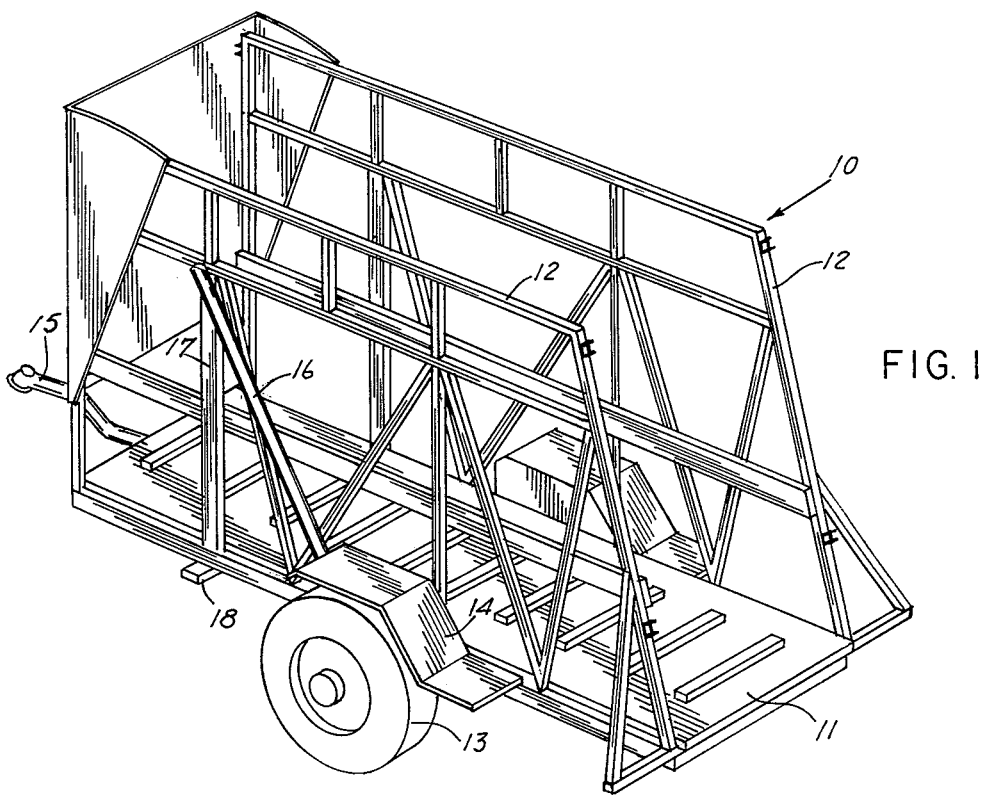
FIG. 1 is a perspective view of a trailer embodying the invention.

Referring now to the drawings, the trailer shown in FIG. 1 comprises a body 10 having a floor 11 and side walls or frame 12 of the openwork type. The trailer is supported on a pair of wheels 13 and fenders 14 are provided over the wheels as mudguards and to provide steps and a platform for side access to the open top of the trailer. A drawbar 15 is secured to the frame of the trailer and extends from the front end. The drawbar is pivotally mounted for swinging movement in a vertical plane.

The wheels are mounted on an axle assembly on which the trailer body rests. The axle assembly is mounted on arms 16 which are pivotally secured to the trailer body on vertical posts 17 and thus may swing about their pivots. The swinging movement of the axle assembly is limited by the trailer body in the traveling position and by rigid stops 18 which limit the forward movement of the axle assembly with respect to the trailer.

The arrangement of the trailer body and wheel assembly is shown in FIG. 4 which also shows the mounting for the drawbar 15. The axle assembly, indicated at 19, comprises a straight tubular body member 21 having wheel axles 22 rigidly mounted at its ends. The axle assembly is shown with the wheels removed. The arms 16 are rigidly secured to the body 19 at the ends thereof in positions spaced outwardly from the longitudinal floor member of the trailer frame which are indicated at 23.

The drawbar mounting as shown in FIGS. 4 and 5 comprises a tubular cross member 24 rotatably mounted about a rigid tube 25 which is rigidly attached to the frame members 23. Longitudinal movement of the tube 24 along the tube 25 is prevented by stop collars 27 secured to the tube 25 by set screws 28. The drawbar 15 is rigidly attached to the tube 24 at the center of the tube and is reinforced against lateral bending movement by triangular plates 30 which are welded to the tube and to the drawbar. The stops 18 have been shown as projecting portions at the bottom ends of the posts.

The rear cross frame member of the floor 11 extends beyond the sides of the body and inclined braces 30 are provided to reinforce the walls 12 and hold then in their vertical positions. Suitable gates or removable closure bars (not shown) are provided for the front and rear ends of the trailer body in the usual manner. A pair of triangular or pie shaped side guards 31 are provided which are pivoted at their bottom ends for swinging movement so that they may be used to close the open spaces present when the trailer is tilted against a barn, cattle car or other structure as during loading and unloading of livestock.

The side frames 12 are constructed of tubular or channel section iron frame members rigidly mounted on the longitudinal frame members 23, and longitudinal wooden guard members 32 are provided on the inner sides of the walls.

Figure 2:
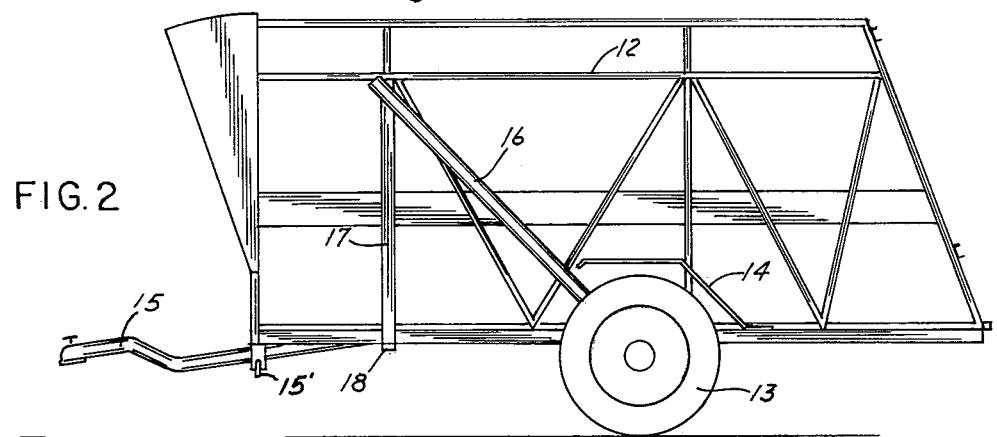
FIG. 2 is a side elevation of the trailer of FIG. 1 partly broken away.
Figure 3:
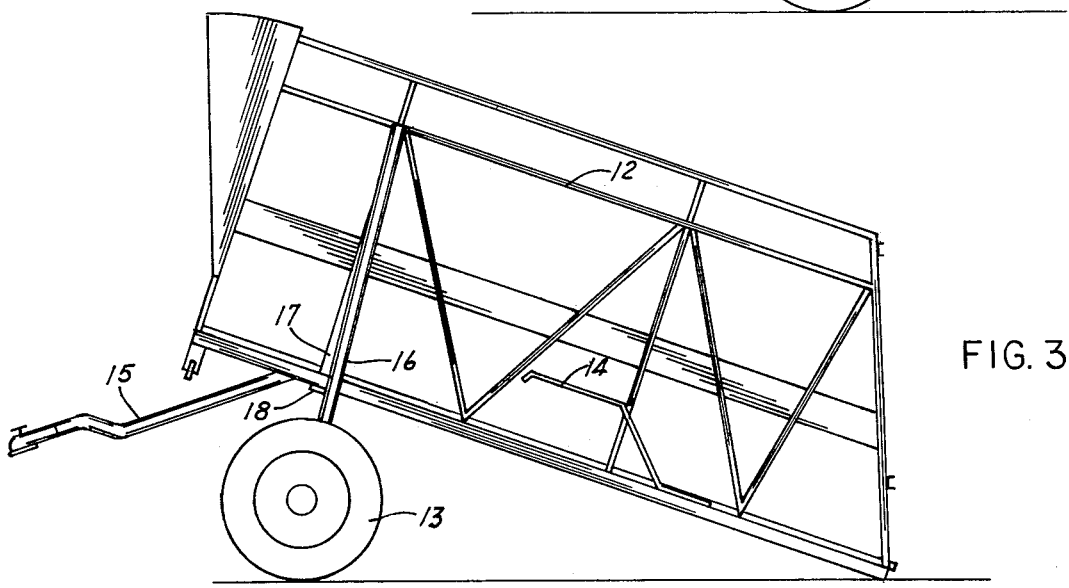
FIG. 3 is a side elevation of the trailer shown in tilted position for loading or unloading.

During travel the trailer body 10 is horizontal as shown in FIG. 2, the drawbar being held by a releasable pin 15′; when loading and unloading the body is tilted rearwardly as shown in FIG. 3, the rear end resting on the ground or other supporting surface. The movement of the trailer from the position of FIG. 2 to that of FIG. 3 is effected by blocking the wheels by the brakes or by separate blocks (not shown), and then driving the towing vehicle (not shown) rearwardly so that the drawbar 15 forces the trailer body rearwardly. This results in the pivoting of the trailer body about the now stationary wheel axis on the arms 16; the body is forced upwardly at the pivots of the arms on the posts 17 until the arms pass the vertical or dead center position and then pivots are lowered slightly until the arms rest against the stops 18. The trailer then is in the position of FIG. 3, the body of the trailer having tilted downwardly with its back end resting on the ground. The horizontal pivotal mounting of the drawbar on the trailer allows the drawbar, when released from the pin 15', to tilt upwardly from the tractor vehicle as the trailer is forced rearwardly, and the tilting of the trailer is controlled by the movement of the tractor vehicle.

The height to which the front end of the trailer is lifted may be adjusted by changing the positions of the pivots on the arms 16. The construction of the arrangement for adjusting the length of the arms to their pivot points on the posts 17 is shown in FIGS. 6 and 7. A spherical knob 35 which is a standard trailer hitch ball has a threaded stem 36 by which it is securely screwed into the upper end of the arm 16. The knob fits with sufficient clearance for sliding within the tubular arm, the arm preferably being of circular cross section. The arm is provided with a longitudinal slot 37 which affords sliding movement of the stem 36 along the arm, and a number of pairs of holes 38 are provided in the arms to receive stop pins 40 which limit the movement of the arm with respect to the ball 35. Two pins 40 are used to limit the movement of the ball in both directions in the arm 16. The pins are bent at one end as shown at one end and are provided with holes at their other ends to receive cotter pins 41 and hold them securely in the selected pair of holes. By this arrangement the pivot of the arm 16 may be moved to selected spaced positions along the upper end portion of the arm. This adjustment determines the height to which the trailer is lifted when it is moved backward with the wheels blocked. FIG. 8 illustrates the position of the trailer body when tilted for loading in two positions, the dotted line position is that for a pivot farther out on the arm 16 than that of the full line position. In both positions the arm 16 is against the stop 18.

The construction of the tiltable trailer of this invention is simple and rugged and enables a single operator to effect the tilting and loading of the trailer and its return to normal horizontal position when loaded.

While the invention has been illustrated in connection with a specific embodiment, other embodiments and applications will occur to those skilled in the art. Therefore, it is not desired to limit the invention to the details of construction and specific arrangements disclosed, and it is intended, by the appended claims, to cover all embodiments which fall within the spirit and scope of the invention.

I claim:

1. A trailer for carrying livestock and other loads comprising;
    a rigid flat frame for supporting a floor,
    means providing rigid supports connected to and extending above said frame on each side thereof,
    a pair of wheels for said trailer mounted on an axle member extending therebetween and positioned below said frame,
    a pair of spaced parallel mounting arms rigidly secured to said axle member and extending laterally normal thereto, one on each side of said frame,
    means for pivoting said arms on said rigid supports a substantial distance above said frame,
    the length of said arms from said axle member to the pivots on said support being substantially greater than the height of said pivots above the bottom of said frame, and said arms extending at an angle rearwardly of of said supports with said frame resting on said axle member,
    said arms being swingable to a forward position over center with respect to said axle member and against stop means rigidly secured to said frame below said supports,
    a drawbar pivotally mounted on the bottom of said frame for swinging movement in a vertical plane whereby when said wheels are blocked and the drawbar is forced rearwardly said arms rotate about said pivot and lift and tilt said trailer until said arms engage said stop means thereby locking said trailer in a predetermined tilted position for loading or unloading.

2. A trailer as set forth in claim 1 wherein the mounting of said drawbar comprises a round frame member extending between the sides of said frame and rigidly secured thereto and an elongated sleeve rotatably mounted on said frame member, said drawbar being rigidly secured to said sleeve near the center of said frame member.

3. A trailer as set forth in claim 2 including stop means attached to said frame member adjacent the ends of said sleeve for limiting movement of said sleeve along said frame member, and braces between said drawbar and said sleeve for reinforcing said drawbar.

4. A trailer as set forth in claim 1 wherein said frame includes a pair of parallel longitudinal side members and said rigid supports are posts rigidly secured to said members at the forward portions thereof, and a cross member rigidly secured to said posts and having ends extending beyond said side members and constituting said stop means.

5. A trailer as set forth in claim 1 wherein said arms are of a length such that said trailer rests on said axle member near the center of the trailer.

6. A trailer as set forth in claim 1 wherein said means for pivoting said arms on said supports comprises spherical knobs each having a stem rigidly secured to a respective one of said side supports, and each of said arms having a longitudinal slot affording sliding movement of the arm with respect to the respective of said knobs, and detachable stop elements for limiting the longitudinal movement of said arms with respect to said knobs.

7. A trailer as set forth in claim 6 wherein said arms have spaced pairs of opposite holes therein and said stop elements are pins passing through selected ones of said holes.

* * * * *